(12) United States Patent
Tesanovic et al.

(10) Patent No.: US 9,330,555 B2
(45) Date of Patent: May 3, 2016

(54) TRACKING EXPOSURE TO ELECTROMAGNETIC FIELDS

(71) Applicant: FUJITSU LIMITED, Kawasaki-shi, Kanagawa (JP)

(72) Inventors: Milos Tesanovic, Harrow (GB); Sunil Keshavji Vadgama, Ashford (GB); Mick Wilson, Romsey (GB)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 14/230,611

(22) Filed: Mar. 31, 2014

(65) Prior Publication Data

US 2014/0313041 A1 Oct. 23, 2014

(30) Foreign Application Priority Data

Apr. 17, 2013 (EP) .................................. 13164179

(51) Int. Cl.
*G08B 21/00* (2006.01)
*G08B 21/18* (2006.01)
*H04B 1/3827* (2015.01)

(52) U.S. Cl.
CPC ............ *G08B 21/182* (2013.01); *H04B 1/3838* (2013.01)

(58) Field of Classification Search
CPC ....... H04M 11/00; H04W 24/00; G08B 21/00
USPC ........... 340/657, 600, 545.3, 552, 567, 686.6; 455/456.1
See application file for complete search history.

(56) References Cited

U.S. PATENT DOCUMENTS

| 2006/0139034 | A1* | 6/2006 | Nevermann | 324/644 |
| 2010/0097228 | A1* | 4/2010 | Schultz et al. | 340/600 |
| 2010/0203862 | A1* | 8/2010 | Friedlander et al. | 455/404.1 |
| 2011/0309945 | A1* | 12/2011 | Hyde et al. | 340/686.6 |
| 2012/0126988 | A1* | 5/2012 | Kaplan | 340/600 |

FOREIGN PATENT DOCUMENTS

| EP | 2 410 661 A1 | 1/2012 |
| WO | 2011/159357 A1 | 12/2011 |

OTHER PUBLICATIONS

*Cooperation: Theme 3: ICT—Information and Communications Technologies* (Updated Work Programme 2011 and Work Programme 2012), European Commission C(2011)5068 of Jul. 19, 2011, 196 pages.

* cited by examiner

*Primary Examiner* — Phung Nguyen
(74) *Attorney, Agent, or Firm* — Staas & Halsey LLP

(57) ABSTRACT

A method of tracking electromagnetic field, EMF, exposure of a user, comprising storing an aggregate EMF exposure value for the user, the aggregate EMF exposure value indicating EMF exposure due to use of one or more devices by the user; obtaining an estimate of EMF exposure associated with use of a particular one of the devices by the user; revising the aggregate EMF exposure value for the user in dependence upon the estimated EMF exposure; comparing the aggregate EMF exposure value to a threshold; and transmitting a signal related to use of the one or more devices if the aggregate EMF exposure value exceeds the threshold.

8 Claims, 3 Drawing Sheets

TRACKING EXPOSURE TO ELECTROMAGNETIC FIELDS

CROSS-REFERENCE TO RELATED APPLICATION

This application claims the foreign priority benefit of European Patent Application No. 13164179.7, filed Apr. 17, 2013, the contents of which are incorporated herein by reference.

FIELD

Embodiments generally relate to tracking electromagnetic fields (EMFs) exposure of a user from a device such as a mobile phone.

BACKGROUND

The use of mobile phones and other devices that emit EMFs is increasing. Initiatives to reduce exposure to EMFs have been proposed both at regional and national levels. For example, the European Union has targeted new radio transmission paradigms and system designs taking into account the need for radical cost and energy per bit reduction and lower EMF exposure, as well as novel radio network topologies, taking into account the need for autonomy, energy efficiency, high capacity backhaul, low EMF radio exposure, and smaller low power base stations, mixed analogue-digital RF design, and novel signal processing methods (Seventh Framework Programme, FP7 ICT Call 8, available at ftp://ftp.cordis.europa.eu/pub/fp7/ict/docs/ict-wp-2011-12_en.pdf).

Many existing technologies concerned with EMF exposure are focused on the cellular network base stations, access points and devices but are not specific to the user.

SUMMARY

According to one embodiment, there is provided a method of tracking electromagnetic field, EMF, exposure of a user, comprising: storing an aggregate EMF exposure value for the user, the aggregate EMF exposure value indicating EMF exposure due to use of one or more devices by the user; obtaining an estimate of EMF exposure associated with use of a particular one of the devices by the user; revising the aggregate EMF exposure value for the user in dependence upon the estimated EMF exposure; comparing the aggregate EMF exposure value to a threshold; and transmitting a signal related to use of the one or more devices if the aggregate EMF exposure value exceeds the threshold.

Because EMF exposure is 'tied' to the user, it can be tracked with respect to, but independent of, the device currently being used. This allows seamless tracking of the EMF exposure when a user switches between devices, for example in the case where multiple devices are associated with (e.g., registered to) the user or where the user replaces one device with another one. The term "device" generally refers to any device with which the user can interact. A device may be mobile, fixed, wireless and/or wired, and may be referred to by other terminology such as a user equipment, a mobile terminal, and a subscriber station. Exemplary devices include cellular phones, smart phones, laptop computers, and PDAs. The method may be performed, entirely or partially, by various entities. In one example, the method is performed at a network node.

The signal may be transmitted to different entities, such as the particular device to which the estimated EMF exposure corresponds (which may be a device currently being used by the user) and/or a device of a third party. For example, where the user is a child, the third party may be a parent. The signal may alternatively or additionally be transmitted to a network entity, such as a gateway, which controls transmission to and/or from the particular device.

The signal may cause a restriction to be imposed on the device. The restriction may be a communication restriction, which may restrict transmissions of a certain type. Restrictions can therefore be selectively applied based on a type of transmission (e.g., voice call, SMS, MMS, email, internet, etc) or even a direction of transmission (uplink or downlink). In some cases, the restriction may be a 'soft' restriction, meaning that it may be overridden by someone with appropriate authority. Alternatively, the signal may cause the device to power down.

The aggregate EMF exposure value may be a moving time window aggregate, such as an aggregate sum or moving average. The restriction can be (gradually) relaxed or removed by transmitting an appropriate control signal, for example when the aggregate EMF exposure value associated with the user returns below the threshold, or when the threshold is changed.

The signal may be of an informative nature, for example providing an indication or warning to the user and/or the third party that the EMF exposure of the user has exceeded a personal allowance (threshold).

Alternatively or additionally, an alert signal transmitted before the threshold is reached could contain EMF level information and/or an estimate of the communication time remaining before a personal allowance is exceeded. A remaining communication time estimate may take into account the historical pattern of usage by the user (for example with reference to different modes and services used) for a more accurate estimate. The alert signal may trigger an audio and/or visual alert at the particular (user) device.

It may be assumed in this embodiment that the user has been pre-identified, for example using any of the methods set out hereinafter and the estimate of EMF exposure may be accompanied by a user identifier. The threshold can be tailored to specific users. For example, the threshold can be set based on at least one of gender and age of the user. It could also be based on any national or international acceptable limit, and could be set by the user or a third party.

According to one embodiment, there is provided a method of tracking electromagnetic field, EMF, exposure of a user, comprising: identifying the user of a device; estimating EMF exposure associated with use of the device by the user; revising an aggregated EMF exposure for the user and taking action in response to the aggregated EMF exposure.

This method can be carried out at, or at least partially at the user device (corresponding to the particular device mentioned above) and again relates to the personal EMF exposure specific to the user.

Taking action may comprise comparing the aggregated EMF exposure to a threshold and imposing a restriction (for example a restriction as previously described) on the user if the aggregate EMF exposure value exceeds the threshold. Thus the entire method may be carried out locally at a user device. Alternatively, the aggregated EMF exposure (whether calculated at the user device or remotely) can trigger a different action, for example simple transmission to a third party device or elsewhere (for example on a periodic basis for parental monitoring of a child's EMF exposure). In such case, a method carried out remotely may comprise accepting input of a user identity and estimated EMF exposure associated with that user, revising an aggregated EMF exposure for the user and transmitting a report of aggregated EMF exposure.

Instead of any local determination of the aggregate EMF exposure, the estimated EMF exposure may be transmitted to a remote device for revising an aggregate EMF exposure value for the user. In this case action may be taken by the remote device (for example a network node or cloud entity)

Identifying the user ensures that only an EMF exposure estimate for that user is transmitted. Where the device is associated with (e.g., registered to multiple users), the transmitted EMF exposure estimate may be accompanied by an identifier of the user.

The method may further comprise receiving a signal from the remote device. This may be a signal of the type referred to above, such as a control signal that imposes a restriction on the device, an informative signal or an alert signal, as mentioned above.

The EMF exposure estimate may be based on a determination of a proximity of the device to a body part or region of the user, such as to the head, upper body region, torso region, and leg region of the user. The EMF exposure estimate may therefore take into account how far the device is away from various body parts or regions of the user.

Different modes of operation (voice call, video call, mobile internet, etc) may result in different EMF exposures. Accordingly, the EMF exposure estimate may be based on a determination of a current mode of operation of the device.

According to one embodiment, there is provided a device for tracking electromagnetic field, EMF, exposure of a user, comprising: a data storage configured to store an aggregate EMF exposure value for the user, the aggregate EMF exposure value indicating EMF exposure due to use of one or more devices by the user; an aggregator configured to revise the aggregate EMF exposure value for the user in dependence upon an obtained estimate of EMF exposure associated with use of a particular one of the devices by the user; and an analyzer configured to compare the aggregate EMF exposure value to a threshold, and to output a signal related to use of the one or more devices if the aggregate EMF exposure value exceeds the threshold.

According to one embodiment, there is provided a unit, for a device, for enabling tracking of electromagnetic field, EMF, exposure of a user, the unit comprising: a user identifier configured to identify the user; and an estimator configured to estimate EMF exposure associated with use of the device by the user, and to revise an aggregate EMF exposure value for the user or to output the estimated EMF exposure for transmission to a remote device for revising the aggregate EMF exposure value for the user.

Thus, such a unit may be implemented within a mobile phone or other user device.

The unit may comprise a controller configured to impose a restriction on the device in response to a control signal received from the remote device.

The unit may include a proximity sensor. Such sensors can employ different sensing techniques and can have different sensing ranges. For example, the proximity sensor may comprise a light sensor. When a voice call is made or received, proximity to an ear of the user can be determined based on a sensed light level. Alternatively, the proximity sensor may be a near-field communication, NFC, circuit configured to wirelessly communicate with an external NFC circuit located at or close to a predetermined body part or region of a user.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configured by suitable software, or a combination of both. Aspects can be embodiment in a software product, either as a complete software implementation, or as an add-on component for modification or enhancement of existing software (such as a plug-in). Such a software product could be embodied in a carrier medium, such as a storage medium (e.g. an optical disk or a mass storage memory such as a FLASH memory) or a signal medium (such as a download, which may be stored for example on the user device). It could be a web application. Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

Different features and sub-features of the methods, device, unit and computer program may be freely combined unless mutually incompatible.

DESCRIPTION OF THE DRAWINGS

Specific embodiments will now be described, by way of example only, with reference to the accompanying drawings, in which.

DETAILED DESCRIPTION

Figure 1:
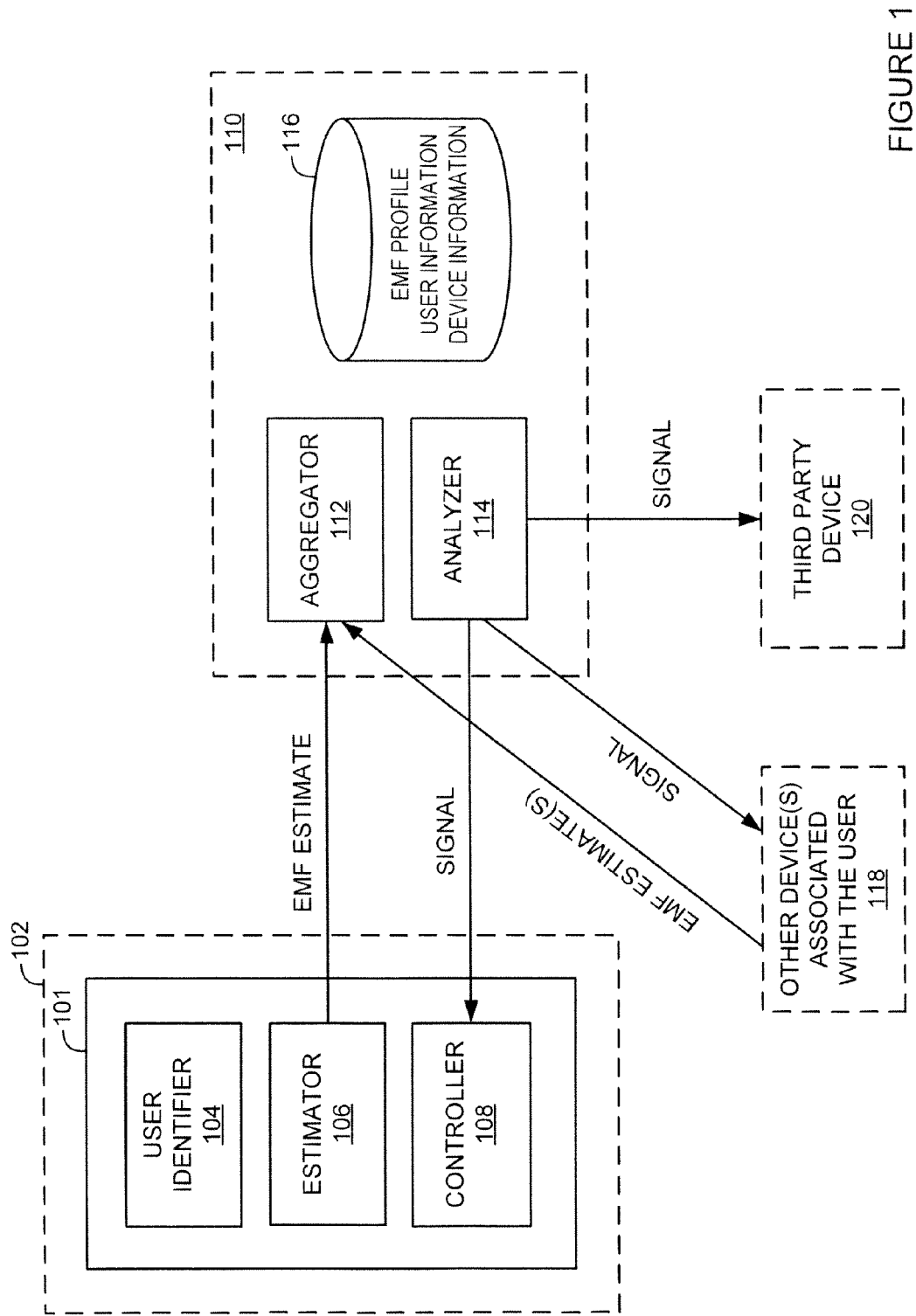
FIG. 1 schematically illustrates a system for tracking EMF exposure according to an embodiment.

Typically, radiofrequency exposure limits for mobile phone users are given in terms of Specific Absorption Rate (SAR)—the rate of radiofrequency energy absorption per unit mass of the body. Guidance on exposure limits is given by the International Commission for Non-Ionizing Radiation Protection (ICNIRP) (Statement on the "Guidelines for limiting exposure to time-varying electric, magnetic and electromagnetic fields (up to 300 GHz)", 2009), which has been adopted by over 80 countries, and the Institute of Electrical and Electronics Engineers (IEEE) in the US (Institute of Electrical and Electronics Engineers (IEEE). (IEEE standard for safety levels with respect to human exposure to radio frequency electromagnetic fields, 3 kHz to 300 GHz, IEEE Std C95.1, 2005). In the US, the safe limit for a mobile phone user is an SAR of 1.6 watts per kg (1.6 W/kg), averaged over a volume of one gram of tissue, while in Europe in the limit is 2 W/kg, averaged over a volume of 10 grams of tissue. EMF exposure estimates may therefore be based on measurements of, for example, transmission power.

The skilled person is aware of appropriate techniques for determining aggregate/effective SAR in presence of time dynamic transmission power levels and multiple antenna transmissions (including multiple transceivers operating on either same or different frequency bands and either same or different Radio Access Technologies such as GSM, UMTS, CDMA etc) in modern wireless communication systems. Tracking time history of transmission events and transmission power level in a UE or in a network to determine EMF exposure level is also known. Techniques are available for identifying usage mode such as: if the device is on flat surface, is in motion, in speaker phone mode, or near a user's body by using sensors such as accelerometers, motion sensors, position/location sensors on-board UE and other information such as speaker/headset mode etc.

However, the known methods of tying the EMF exposure measure to a device are inadequate in a modern communications scenario. Use of multiple wireless devices (eg: phone, tablet, notebook PC, gaming controller etc.) is becoming more prevalent. Therefore it is desirable that the measurement and exposure analysis should be user centric rather than device centric.

Also, the inventors have realised that there it would be desirable to provide new network and/or device management which can monitor, control and/or reduce the personal EMF levels but at the same time preferably compromise the user's Quality of Service (QoS) as little as possible. There are many different ways to achieve this effect, and various embodiments are explained below.

Embodiments are described in the context of EMFs generated when mobile phones and other wireless devices transmit radio signals (referred to as radiofrequency (RF) EMFs). However, this should not be viewed as presenting any limitation on the scope of protection sought.

Embodiments provide a mechanism for tracking user exposure to EMFs emitted by devices such as mobile phones, and, in certain circumstances, for restricting device usage when the EMF exposure increases beyond an acceptable level.

Some embodiments of the present invention can focus on enhancing power control on the uplink (UL). The mobile phones or terminals (UE in LTE parlance) are held or placed in many different positions with respect to the user; the terminals are no longer either idle, or pressed against the user's ear. Additionally, mobile terminals are used by people of many different ages, both men and women, and a single EMF exposure based terminal power control algorithm would not be optimal. A key observation in some embodiments is that the same terminal transmit power on the UL will result in very different user EMF exposure levels, depending on the location of the terminal with respect to the user. Even with same EMF exposure levels, their impact is different depending on the gender and the age of the user and the past EMF exposure history: thus it is important that EMF is assessed in a way which is user specific. These embodiments of the invention devise a way of restricting user access to a mobile device, based on the estimated EMF exposure of the user and its estimated impact on the user.

According to the simplest embodiments, the device can automatically power down (ie: suspend transmissions) once the EMF exposure of the user is estimated to have exceeded a certain threshold. This would be especially useful for restricting EMF exposure levels to children/youths or EMF vulnerable adults.

Invention embodiments also refer to a modern communication scenario in which the users are making use of more than one device and sometimes the device is shared. By using user recognition technologies (such as voice recognition, passwords/pin numbers, and/or other biometric signatures such as face recognition and fingerprint recognition) we can automatically uniquely associate EMF exposure estimates to an individual. The user may need to register all of his/her devices and user recognition information.

In a network/Cloud service embodiment, the EMF exposure measurements and/or estimates may be logged and analysed in the Cloud or another node/device to determine appropriately aggregated EMF exposure level due to using multiple devices experienced by the user. Then the current aggregated EMF exposure level may be compared with pre-set EMF exposure profiles for that user. Upon comparison, if the exposure level is reached or exceeded then suspension of transmissions from some or all of the currently active devices used by that user may be triggered.

Subsequently any attempts by that user to activate transmissions from any one or more of the devices (acts which would add to the EMF exposure level experienced by that user) would be restricted or inhibited, for example until the such sufficient time has elapsed such that time-windowed level of EMF exposure level falls below the pre-set level defined by the user's EMF exposure profile settings.

Invention embodiments can recognise the individual users and associate the EMF exposure to individual users. This recognition could be based on one or more of, for example, biometrics used to unlock the phone, recognising the user by voice pattern or by face recognition or other means such as password (used for things like web browsing etc.). This enables the EMF "allowance" to be a "personal" one rather than a "phone" one.

Embodiments of the invention allow an intelligent approach to EMF control, for example, rather than simply suspending all transmissions from the user device, it can be restricted to a sub-set, such as: Emergency Calls (for example not only to emergency services but also to parents, teachers etc), as well as low-exposure services such as SMS. Thus intelligent service level control may be effected based on cumulative EMF exposure level of the user. Invention embodiments may additionally allow gender based considerations, for example by causing the device to be powered down when it is in a specific location (e.g. kept in the pocket) whilst the phone is in active mode using a headset. This variant may be particularly of interest to some couples who are attempting to conceive. Tablet devices and notebook PCs tends to be often put on laps whilst in transmission mode (eg: gaming, emailing, uploading photos/videos/files, video calls etc) for much longer periods of time than voice conversations. Often this is because of habit and convenience. In these and other cases the variant involving location proximity detection to sensitive/certain parts of the body could be advantageous.

The ways of estimating the terminal proximity to the user and the location of the terminal could be further extended in invention embodiments by RFID tags attached to, for example, clothing such as underwear or a belt.

As mentioned above, additional embodiment functionality could report or log the exposure to the Cloud (network based computing resources) or a remote device or node (for example to which the parent has access). Additionally or alternatively, texts could be sent to, for example to the parents indicating that their child's phone had to power down. Equally, periodic updates on their child's exposure when the phone is being used could be sent. The processing of the data such as aggregation and limit setting could also be in the Cloud or remote device/node. This requires information transfer from the user device to the remote device or server responsible for logging and exposure aggregation. This in turn could control the user device (or send information to the device in use to apply EMF exposure limitation profile/policy).

In considering the individual according to invention embodiments, the exposures may be from multiple devices (which the individual may use—but may not own), in which case a network service can be more appropriate as it has potential to aggregate exposure due to multiple sources. The server could control (or provide information to constrain)

some or all of the communications services from some or all of the devices depending on the EMF exposure profile depending on the estimated level of EMF exposure arising from each device, service and typical usage mode.

Referring now to FIG. 1, a system for tracking of EMF exposure comprises a unit 101 of, in this example, a mobile device 102 and a device 110 for tracking EMF exposure. It will be appreciated that well-known components such as transmitters, receivers and networks are not shown in the interests of clarity.

The unit 101 comprises a user identifier 104, an estimator 106 and a controller 108. The user identifier 104 is configured to identify the user, in accordance with identification techniques such as passwords, pin numbers and biometric identifiers (e.g. voice, fingerprint, iris/retina and/or facial patterns), in order to allow EMF exposure estimates of the estimator 106 to be uniquely associated to an individual. It will be understood that the mobile device 102 may include means for identifying the user, and that the user identifier 104 may cooperate with (e.g. receive an output from) such means in order to confirm the identify of the user. The controller 108 is configured to act upon signals received from the device 110 (described in more detail subsequently).

Mobile phones typically operate at frequencies of between 450 and 2700 MHz with peak powers in the range of 0.1 to 2 watts. The power (and hence the EMF exposure of a user) falls off rapidly with increasing distance from the handset. A person using a mobile phone held away from their body—for example when text messaging, accessing the Internet, or using a "hands free" device—will therefore have a different (lower) exposure to EMFs than someone holding the handset against their head. Thus, the same terminal transmit power on the uplink can result in different user EMF exposure levels depending on the location of the terminal with respect to the user. The estimator 106 may therefore comprise mode detection and/or a proximity sensor in order to determine proximity of the device 102 to a body part or region of the user. As with the user identifier 104, it will be understood that the mobile device 102 may include proximity sensors with which the estimator 106 may cooperate with (e.g. receive an output from) in order to estimate EMF exposure taking proximity into account.

The role of the device 110 is to track EMF exposure and determine an aggregate EMF exposure value for a user. To that end, the device 110 comprises an aggregator 112 and an analyzer 114. Also provided is a data storage 116 for storing aggregated EMF values for the user, as well as user information and device information for when dealing with multiple users and multiple devices.

As described previously, the estimator 106 of the unit 101 estimates EMF exposure. The EMF estimate is obtained by the aggregator 112, for revising (updating) the aggregate EMF exposure value associated with that user. This revision may use any suitable methodology. For example the aggregator could use a weighted sum approach to EMF exposure, with weights attached to different user devices and/or QoS levels and/or other variables. Alternatively or additionally, a weighted sum approach might be used in the estimator 106, for instance when the mobile device 102 benefits from different services, which may have different EMF effects, The analyzer 114 compares current aggregated EMF exposure values with a pre-set EMF exposure threshold for that user. If the EMF exposure level is reached or exceeded, the device 110 can trigger suspension of transmissions from some or all of the currently active devices used by that user. More specifically, the analyzer 114 outputs a control signal which is transmitted to the controller 108 of the unit 101. The signal may also be transmitted to other devices 118 associated with the user, using the device information stored in data storage 116. Subsequent attempts by the user to activate transmissions from any one or more of the devices, which would add to the EMF exposure level experienced by that user, can be restricted or inhibited until sufficient time has elapsed for an EMF exposure level aggregated over a moving time window to fall below the threshold. For example, the aggregator 112 may apply an aggregation function over a moving time window. The aggregation value changes over time as the time window moves. The size of the time window can be specified using a time interval ending at a current time.

The restriction imposed on the device 102 need not suspend all transmissions from the device. For example, certain types of transmission may remain unrestricted, for example low-EMF exposure services such as SMS. Furthermore, transmission to certain destinations may remain unrestricted, for example calls to certain predefined numbers (emergency services, relatives, etc).

The restriction imposed on the device 102 may be conditional on how the device 102 is being used and/or the location of the device relative to the user. For example, the restriction may be put in place if the device 102 is held against their ear, and removed if a "hands free" set (associated with a lower exposure) is used. Another example is where the device 102 is a laptop, which are often placed on the user's lap for long periods of time whilst in transmission mode (e.g. gaming, emailing, uploading photos/videos/files, video calls etc). Here, the restriction may be put in place if the device 102 is put on their lap, and removed if the laptop is placed further away from the user. The proximity of the device to the user could be determined using near-field communication technologies such as RFID tags, for example attached to clothing of the user. Other ways in which the proximity of the device to the user can be determined will be apparent to the skilled person in the art and are therefore not discussed in detail herein.

In embodiments, the signal output by the analyzer 114 is of an informative nature. For example, the signal can be an alert signal that is transmitted to the third party device 120. Such an alert signal, which may be transmitted in the form of a text message for example, could inform the third party that the restriction has been imposed on the device 102. Alert signals may also be sent to the controller 108, for example to alert the user when the aggregate EMF exposure level approaches the threshold. Alternatively, the user and/or the third party can be periodically informed of the user's current aggregate EMF exposure level.

It will be understood that the functional blocks shown in FIG. 1 may be implemented in various different configurations, with functional blocks being combined or divided.

Figure 2:
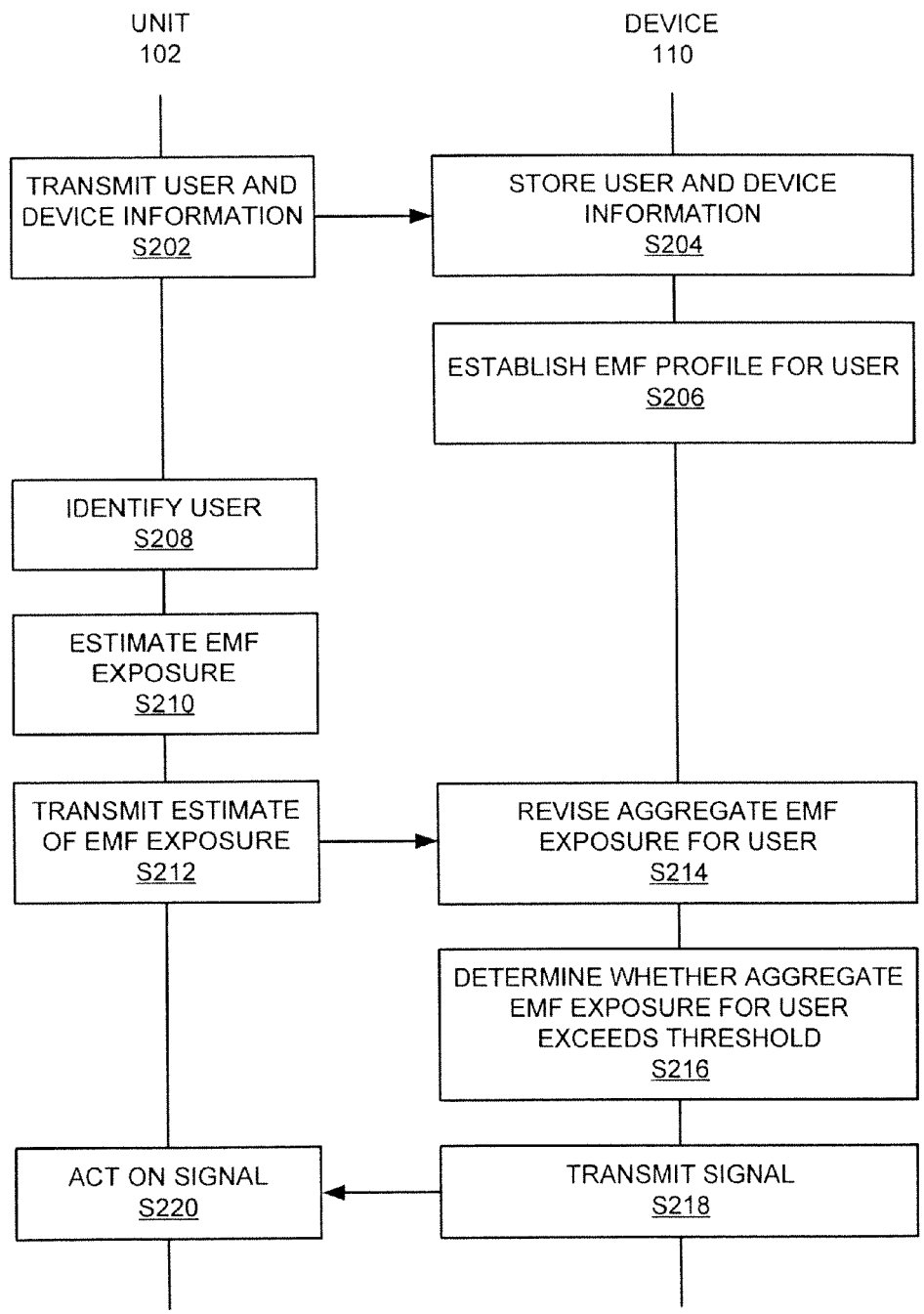
FIG. 2 is a sequence diagram showing a method of tracking EMF exposure according to an embodiment.

FIG. 2 illustrates steps of tracking EMF exposure of a user according to the above described embodiment.

At step S202, the user transmits user and device information to the tracking device. This may be to register as a new user and/or register a new device with which the user is associated. The information is stored at the device 110 (step S204). The type of information can include the age and gender of the user, as well as the type of device (mobile phone, laptop, etc). Then, an EMF profile for the user is established (step S206). The profile includes an aggregate EMF value for the user and a threshold value. The threshold value may be determined based on the user information obtained at step S204.

When the device 102 is used, the user is identified (step S208) and an EMF exposure is estimated (step S210). This is transmitted to the device 110, possibly together with information identifying the user (step S212). Upon receipt of the information, the tracking device 110 updates the aggregate EMF exposure value for the user (step S214), and determines whether the updated aggregate EMF exposure for the user exceeds a threshold (step S216). A signal is then transmitted to the user device (step S220), which may be acted upon by the user device (step S222). As noted previously, the signal may cause the display of information to the user and/or cause a restriction to be imposed on the device. As also noted previously, the signal may instead or additionally be transmitted to third party device.

Figure 3:
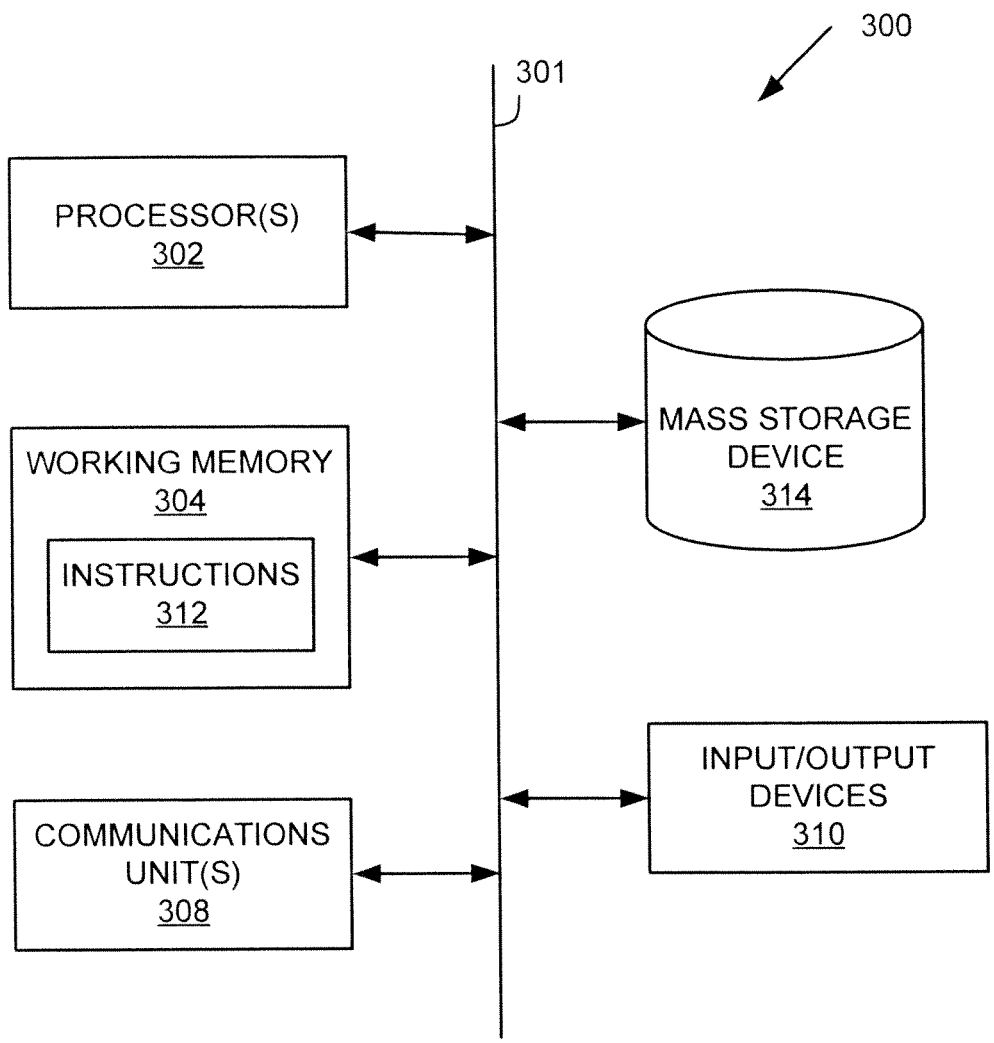
FIG. 3 schematically illustrates a device for tracking EMF exposure according to an embodiment.

FIG. 3 is a block diagram of a computing device 300, within which a set of instructions for causing the computing device 300 to perform any one or more of the methodologies discussed herein may be executed. The computing device 300 may be a mobile device such as a cell phone, laptop computer or PDA, or a server computer, or any computing device capable of executing a set of instructions (sequential or otherwise) that specify actions to be taken by the computing device 300.

The computing device 300 may include a processor 302 (e.g., a central processing unit (CPE), a graphics processing unit (GPU) or both), a working memory 304 and mass storage device 314, all of which communicate with each other via a general purpose bus 301. The computing device 300 may further include one or more communications units 308 and input/output devices 310. Input devices can include, for example, a display, a keyboard, a mouse or other pointing device, a touchscreen, biometric recognition means, or any other means by which a user input can be interpreted and converted into data signals. Output devices can include, for example, audio/visual output hardware devices such as a visual display unit, a speaker or any other device capable of presenting information.

The mass storage device 314 stores machine code instructions 312 (i.e. software) embodying any one or more of the methodologies or functions described herein. The machine code instructions 312 may also reside, completely or at least partially, within the working memory 312 and/or within the processor 302 during execution thereof by the computer device 300. The machine code instructions 312 may further be received over a network via the communications unit(s) 308. Also, a computer program product, comprising a storage medium, can be introduced to the computing device 300, so that stored machine code instructions can then be transferred to the computing device 300. Furthermore, the reader will appreciate that the computing device 300 may be supplied with known software such as an operating system (e.g. Android, iOS, Mac OS, MS Windows, Unix, or Linux), so that any computer program may be developed as a new, standalone program or as a plug-in to existing computer programs.

The communications unit(s) 308 is connected to the general purpose bus 301 and may comprise a wireless communications unit connected to one or more antennas to and/or a wired communications unit. Accordingly, different wired and/or wireless technologies including TCP/IP, HTTP, Ethernet, 802.11x, WiMax, LTE, and others, may be employed.

While certain embodiments have been described, these embodiments have been presented by way of example only, and are not intended to limit the scope of the inventions. Indeed, the methods, devices and systems described herein may be embodied in a variety of other forms; furthermore, various omissions, substitutions and changes in the form of the methods, devices and systems described herein may be made without departing from the spirit of the inventions. The accompanying claims and their equivalents are intended to cover such forms or modifications as would fall within the scope and spirit of the inventions.

The invention claimed is:

1. A method of tracking electromagnetic field, EMF, exposure of a user, comprising:
   receiving and registering, at a network device, information about the user and information about each of a plurality of user devices associated with the user;
   identifying, by one of the user devices, the user during use of the user device;
   estimating, by the user device, EMF exposure associated with use of the user device by the user;
   transmitting, from the user device to the network device, a value of the estimated EMF exposure together with information identifying the user;
   revising, by the network device, an aggregated EMF exposure value for the user using the value of the estimated EMF exposure, the aggregated EMF exposure value indicating EMF exposure due to use of the plurality of user devices by the user;
   comparing, by the network device, the revised aggregated EMF exposure value to a threshold; and
   transmitting, by the network device to the user device, a signal related to use of the user device if the revised aggregated EMF exposure value exceeds the threshold.

2. The method according to claim 1, wherein the signal comprises a first control signal that imposes a communication restriction on the user device.

3. The method according to claim 2, wherein the aggregated EMF exposure value is aggregated over a moving time window, the method further comprising transmitting a second control signal configured to relax or remove the communication restriction when the aggregated EMF exposure value returns below the threshold.

4. The method according to claim 1, wherein the signal comprises an alert signal that provides an alert that the aggregated EMF exposure value for the user exceeds the threshold.

5. The method according to claim 1, wherein the threshold is set based on at least one of gender and age of the user.

6. The method according to claim 1, wherein the estimating comprises determining a proximity of the user device to a body part or region of the user.

7. The method according to claim 1, wherein the estimating comprises determining a mode of operation of the user device.

8. A network device configured to track electromagnetic field, EMF, exposure of a user, comprising:
   a data store configured to store information about the user, information about each of a plurality of user devices associated with the user, and an aggregated EMF exposure value for the user, the aggregated EMF exposure value indicating EMF exposure due to use of the plurality of devices by the user;
   an aggregator configured to receive, from one of the plurality of user devices, a value of estimated EMF exposure associated with use of the user device together with information identifying the user, and to revise the aggregated EMF exposure value for the user using the value of estimated EMF exposure; and
   an analyzer configured to compare the revised aggregated EMF exposure value to a threshold, and to output a signal related to use of the user devices if the revised aggregated EMF exposure value exceeds the threshold.

\* \* \* \* \*